Figure 1:
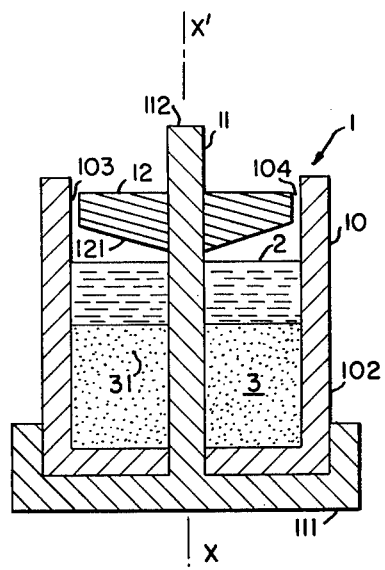

United States Patent [19]

Durand

[11] 4,166,154

[45] Aug. 28, 1979

[54] PROCESS PERMITTING THE INTRODUCTION OF PARTICLES INTO THE LIQUID OF A CHEMICAL AND/OR ELECTROCHEMICAL REACTOR

[75] Inventor: Pierre Durand, Clermont-Ferrand, France

[73] Assignee: Compagnie Generale des Etablissements Michelin, Clermont-Ferrand, France

[21] Appl. No.: 883,323

[22] Filed: Mar. 3, 1978

[51] Int. Cl.$^2$ ............................................ H01M 8/06
[52] U.S. Cl. ....................................... 429/17; 429/19; 429/34
[58] Field of Search ........................ 429/15, 17, 19, 23, 429/27, 29, 34, 18, 68, 70, 95

[56] References Cited

U.S. PATENT DOCUMENTS

| 3,520,728 | 7/1970 | Beccu | 429/70 |
| 3,592,698 | 7/1971 | Baba | 429/34 |
| 3,847,671 | 11/1974 | Leparulo et al. | 429/15 |
| 3,887,400 | 6/1975 | Doniat et al. | 429/70 X |
| 3,981,747 | 9/1976 | Doniat et al. | 429/15 |

FOREIGN PATENT DOCUMENTS

| 2521090 | 11/1976 | Fed. Rep. of Germany . |
| 779233 | 1/1935 | France . |
| 258281 | 5/1970 | U.S.S.R. . |

*Primary Examiner*—Anthony Skapars
*Attorney, Agent, or Firm*—Brumbaugh, Graves, Donohue & Raymond

[57] ABSTRACT

In a process consisting of introducing particles into a reactor liquid, a compact feed mass comprising primary particles and a compacting liquid is eroded so as to dissociate said compact feed mass into secondary particles, which are entrained into the reactor liquid by a carrier liquid.

A device for the carrying out of this process comprises erosion means and circulating means.

30 Claims, 10 Drawing Figures

PROCESS PERMITTING THE INTRODUCTION OF PARTICLES INTO THE LIQUID OF A CHEMICAL AND/OR ELECTROCHEMICAL REACTOR

This invention relates to chemical and/or electrochemical processes and to reactors for the carrying out of such processes. The invention concerns, in particular, reactors which employ a liquid, known as the reactor liquid, within which solid particles are contained.

When the reactor is an electrochemical reactor, the particle-containing liquid feeds an anode or cathode chamber within which at least one electrochemical reaction takes place. This reaction occurs by electronic exchanges and the electric charges which are liberated during the course of the electrochemical reaction or which are necessary for such reaction are collected or delivered by a member which is a conductor of electricity, known as the "electron collector", located in the electrochemical compartment. The electronic exchanges may, on the one hand, affect the liquid (or a product transported by the liquid in solution or emulsion form), the solid particles being, for instance, catalytic particles. The electronic exchanges may, on the other hand, affect the particles, the liquid being, for instance, an electrolyte and the particles being, for instance, particles formed, in whole or in part, of an active material, at times referred to as "fuel", when the reactor is an electrochemical current generator.

In order to obtain optimum operation of these chemical or electrochemical reactors, it is necessary to maintain the respective proportions of liquid and particles in these reactors within precise limits, the spread between these limits being in general small when the other operating parameters have been determined. Two processes directed at solving this problem have been proposed.

On the one hand, it has been proposed to use dry particles which are introduced into the liquid. This process requires the storage and handling of dry particles, which is difficult and at times dangerous to carry out when the particles react with the air. Furthermore, the liquid wets the various parts of the feed device, which interferes with such feed.

On the other hand, it has been proposed to form a concentrated slurry of the particles in a carrier liquid and introduce this slurry into the reactor liquid, the carrier liquid being either identical to the reactor liquid or compatible with it. Experience shows in this case that settling of the particles within the slurry is very difficult to avoid, so that agitation is necessary before introduction into the reactor, which consumes a substantial amount of energy in view of the high viscosity of the slurry. On the other hand, prolonged contact of the particles with the carrier liquid may give rise to attack on the particles, that is to say to a loss of product, this attack possibly liberating gases which interfere with the storing and introduction of the particles, which gases may furthermore raise serious problems with respect to safety.

The object of the present invention is to avoid these drawbacks. Accordingly, the process of the invention, which consists in introducing particles into at least one liquid, called the reactor liquid, used in at least one chemical and/or electrochemical reactor, is characterized by the fact that at least one substantially compact feed mass comprising particles, called primary particles, and a small amount of at least one liquid, called compacting liquid, which is chemically unreactive or only slightly reactive with said primary particles is eroded so as to dissociate said compact feed mass into particles, called secondary particles, which are entrained into the reactor liquid by at least one carrier liquid. The invention also concerns the devices for the carrying out of this process which comprise erosion means and circulating means.

Figure 2:
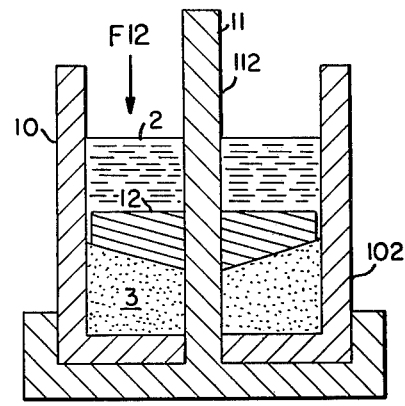
Figure 3:
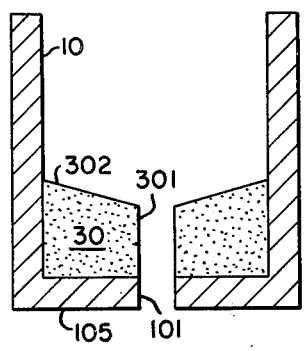
Figure 4:
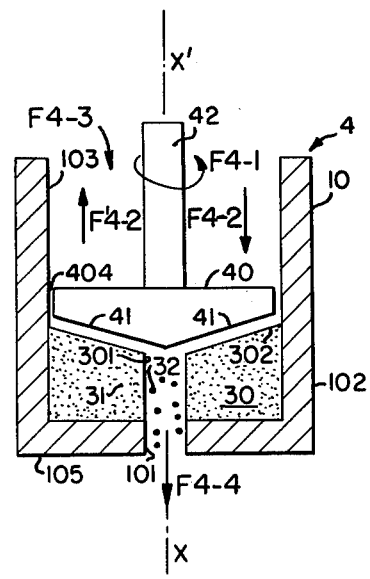
Figure 5:
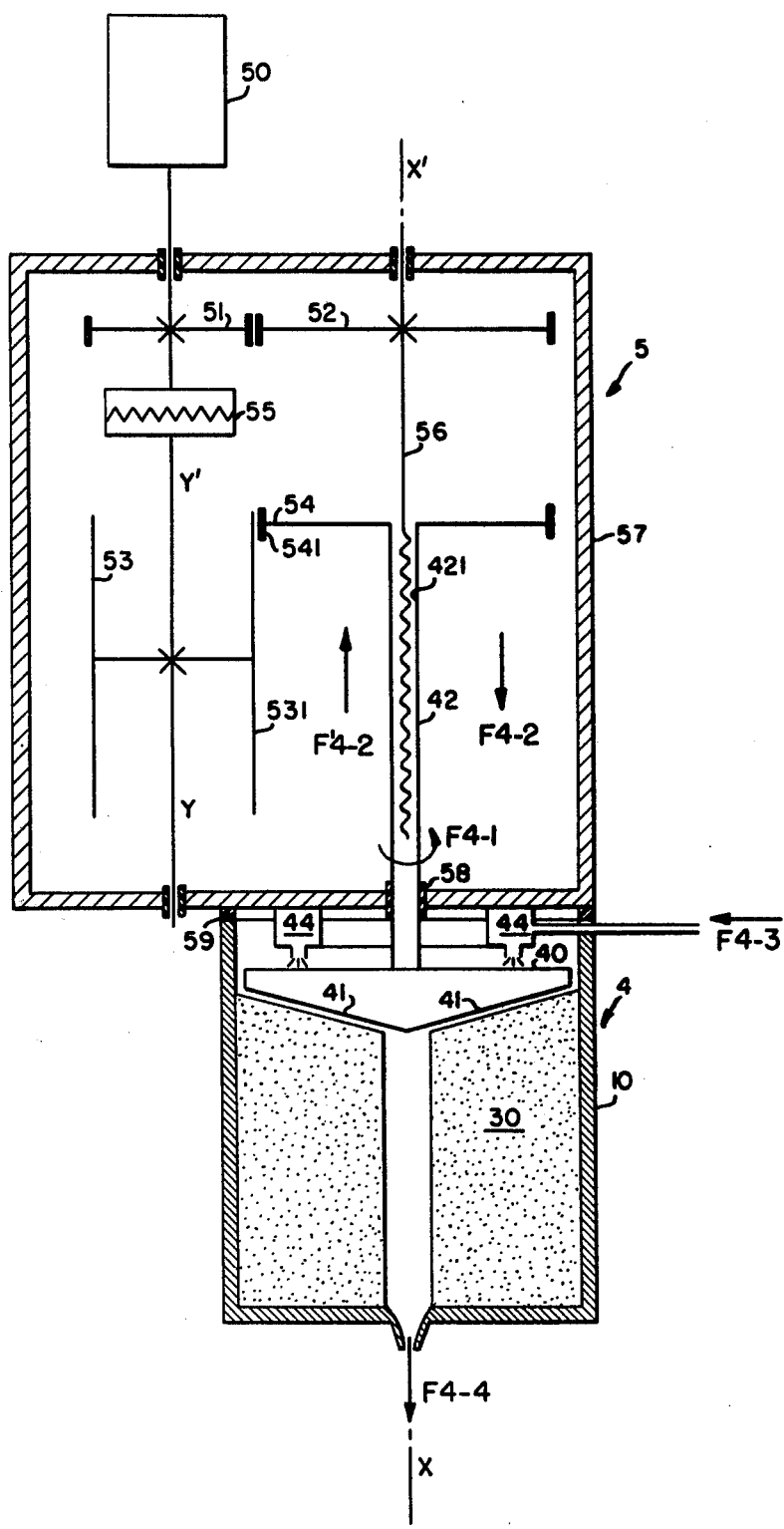
Figure 6:
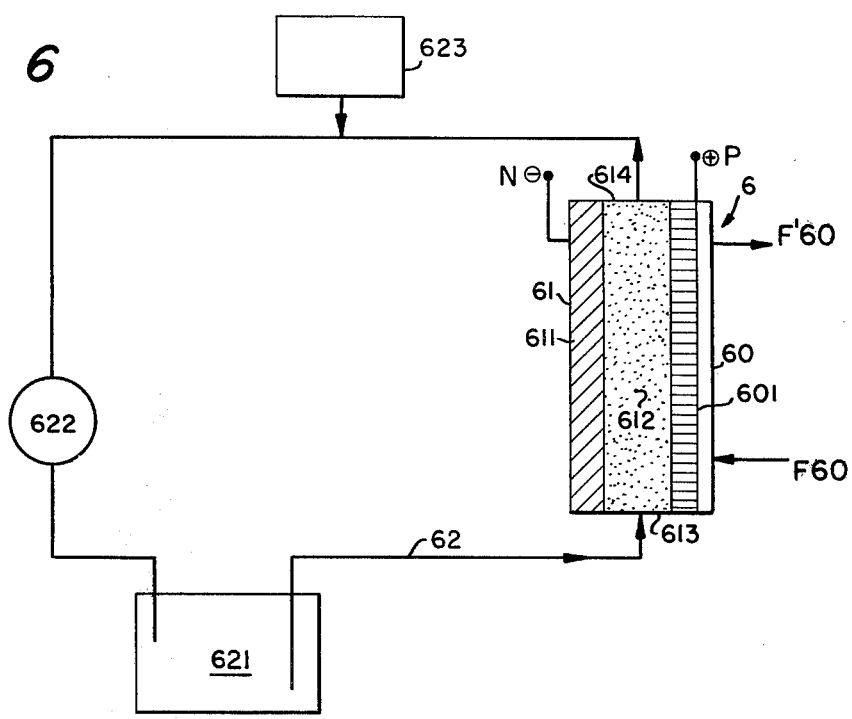
Figure 7:
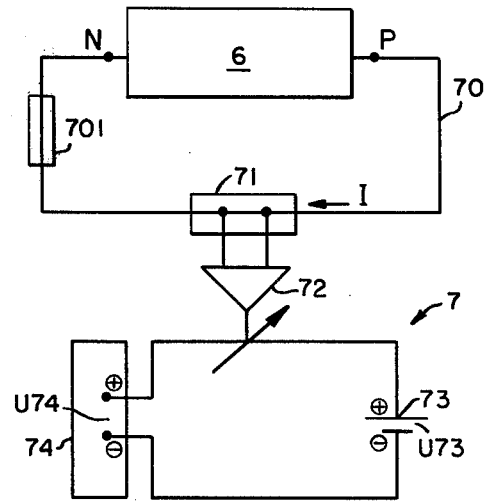
Figure 8:
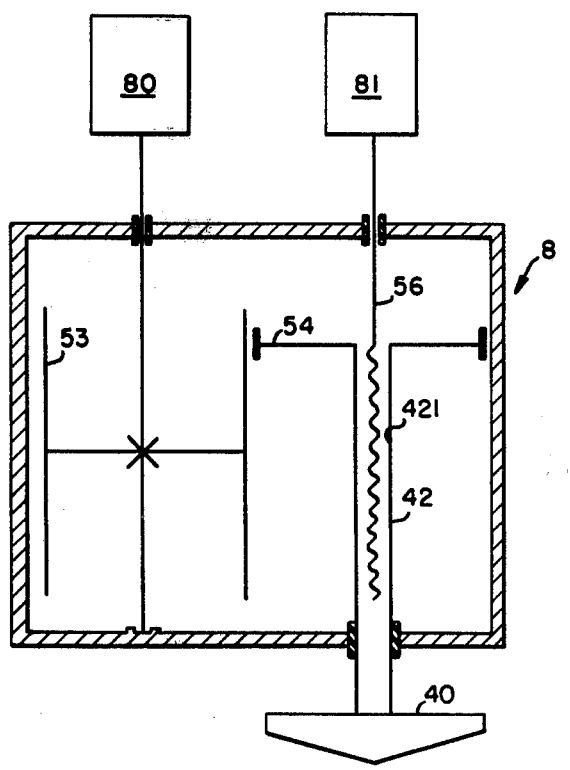
Figure 9:
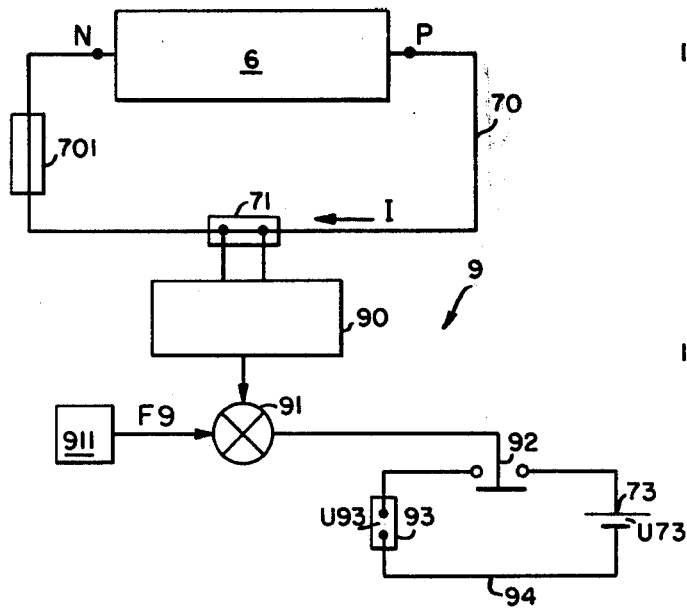
Figure 10:
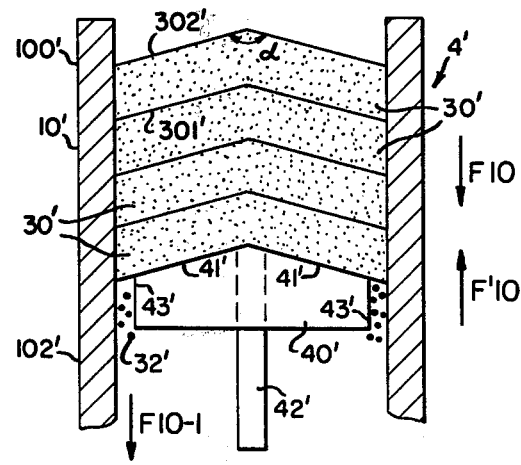

The invention will be readily understood by means of the following nonlimitative examples and drawings. In these drawings:

FIGS. 1 to 3 show schematically in cross section a compacting device in accordance with the invention for the preparation of a compact feed mass, FIG. 4 shows schematically in cross section an erosion device in accordance with the invention for the eroding of a compact feed mass, FIG. 5 shows schematically in cross section a feed device in accordance with the invention comprising the erosion device shown in FIG. 4, FIG. 6 shows schematically in cross section an electrochemical generator employing a feed device in accordance with the invention, FIG. 7 shows an electric circuit diagram which makes it possible to control the operation of a feed device in accordance with the invention by the intensity of the electric current delivered by an electrochemical generator, FIG. 8 shows schematically in cross section another feed device in accordance with the invention, FIG. 9 shows an electric circuit diagram which makes it possible to control the operation of a feed device according to the invention by the amount of electricity delivered by an electrochemical generator, and FIG. 10 shows schematically in cross section another feed device in accordance with the invention.

Referring to FIGS. 1, 2 and 3 of the drawings, the device 1, called the compacting device, comprises a cylinder of revolution 10, called the compacting cylinder, which is provided at its lower part with an opening 101 into which a removable part 11 is introduced. This removable part 11 comprises a base 111, within which the lower portion 102 of the cylinder 10 is housed, and a vertical cylindrical rod 112 arranged substantially along the axis XX' of the cylinder 10. A movable part 12, called the piston, slides along the rod 112. The axis XX' is the axis of revolution for the compacting device 1, that is to say for the cylinder 10, the removable part 11, and the piston 12, the diameter of the rod 112 being substantially equal to the diameter of the opening 101.

The lower portion 121 of the piston 12 forms a conical frustum in relief, the flaring of which faces upward. At least one compacting liquid 2 and primary particles 31 are poured into the cylinder 10, the liquid 2 and the particles 31 being chemically nonreactive or only slightly reactive with each other. The particles 31, whose density is greater than that of the liquid 2, sediment out and form a sedimentation bed 3 containing a large amount of liquid 2. The piston 12 is caused to slide towards the lower part 102 of the cylinder 10 in the direction indicated by the arrow F12 (FIG. 2) so as to compact the sedimentation bed 3 and remove the major part of the liquid 2 from said bed.

This result can be obtained, for instance, by providing, between the piston 12 and the inner wall 103 of the cylinder 10, a clearance 104 which is less than the average diameter of the particles 31, this clearance being considerably exaggerated in FIGS. 1 and 2 for the purposes of clarity. The liquid 2 which is free of particles 31 thus collects above the piston 12 upon the compacting of the bed 3 (FIG. 2). The liquid 2, which has collected above the piston 12, is evacuated and the piston 12 and the removable part 11 are removed. There then remains the cylinder 10 within which there is contained the compact mass 30, known as the compact feed mass, containing a small amount of liquid 2 and having, at its center, an opening 301 which corresponds to the opening 101 of the cylinder 10 and communicates with said opening (FIG. 3).

In view of the small amount of liquid 2 in the compact feed mass 30, said mass 30 can be stored for a long period of time, even if the liquid 2 and the particles 31 react slightly with each other; the mass 30 can remain in the cylinder 10 during the storage or be removed from the cylinder 10 and stored, since the compacting enables it in general to retain its shape. The compacting operation can be carried out without prior sedimentation of the particles 31, the piston 12 then moving in a suspension of particles 31 in the liquid 2, but prior sedimentation is preferable in order to facilitate the separation between the particles and the major part of the liquid 2.

FIG. 4 shows an erosion device 4 which makes it possible to erode the compact feed mass 30 for feeding into at least one chemical or electrochemical reactor (not shown). This erosion device 4 comprises a feed cylinder, for instance the cylinder 10 which has already been shown in FIGS. 1 to 3, within which cylinder the compact feed mass 30 is located. A head 40, called the erosion head, has knives 41 and a hollow rod 42 which permits said head 40, on the one hand, to rotate around the axis XX', identical to the axis XX' shown in FIG. 1, this rotation being indicated symbolically by the arrow F4-1, and, on the other hand, to carry out movements of translation parallel to the axis XX' and represented by the arrows F4-2 and F'4-2.

The introduction of the compact feed mass 30 into the electrochemical generator is effected in the following manner. The head 40 is displaced in the direction indicated by the arrow F4-2 so that the knives 41 are substantially tangent to the conical frustum 302 which corresponds in intaglio to the impression in the compact feed mass 30 of the piston 12, that is to say to the upper face of the mass 30. The rotation of the head 40 then permits erosion of the mass 30 by the knives 41, the mass 30 then giving secondary particles 32 which can, for instance, be substantially the same in size as the dissociated particles 31, unless the secondary particles 32 are formed by fragmentation or agglomeration of the primary particles 31.

The head 40 moves towards the bottom 105 of the cylinder 10, as indicated by the arrow F4-2, as the erosion progresses. At least one carrier liquid is introduced into the cylinder 10 via a circulating means or inlet above the head 40, as indicated by the arrow F4-3, directed towards the bottom 105 of the cylinder 10. The carrier liquid flows towards the compact feed mass 30, preferably in sufficient amount to cover said entire mass, via a clearance 404 provided between the head 40 and the inner wall 103 of the cylinder 10, this clearance being preferably smaller than the average diameter of the primary and secondary particles 31 and 32, respectively. This clearance 404 is considerably exaggerated in FIG. 4 for the purpose of clarity.

The carrier liquid entrains the secondary particles 32 towards at least one reactor fluid (not shown) through the openings 301 and 101, in the direction indicated by the arrow F4-4, the intaglio frustoconical shape of the mass 30 facilitating this entrainment. The erosion of the mass 30, that is to say, in particular, the dissociating of the compacted particles 31 is facilitated by the presence, within the mass 30, of the compacting liquid 2 which lubricates the particles 31. When the mass 30 has been eroded as completely as possible, the head 40 is withdrawn, as indicated by the arrow F'4-2, so as to use the cylinder 10 again for the production of a new compact feed mass 30.

FIG. 5 shows a feed device 5 comprising the erosion device 4 which has been described above and which erosion device 4 comprises an inlet 44 of circulating means for introducing the carrier liquid above the head 40 as indicated by the arrow F4-3. A motor 50 drives two gearings in rotation, namely: the gearing formed of the pair of gear wheels 51, 52 and the gearing formed of the pair of gear wheels 53, 54, the gear 53 being driven by the motor 50 via the clutch device 55. The reduction ratios of these pairs of gear wheels are slightly different. The gear wheel 52 is rigidly connected with a screw 56 which rotates in the nut 421 formed by the inner wall of the hollow rod 42 which is rigidly connected with the gear 54, the axis of rotation of the gear 54 being identical to that of the head 40, that is to say to the axis XX'. The speed of translation F4-2 of the rod 42 is thus proportional to the difference in the angular speeds of rotation of the gear wheels 52 and 54 and to the pitch of the system formed by the screw 56 and the nut 421.

This translation takes place by a sliding of the teeth 541 of the gear wheel 54 along the teeth 531 of the gear wheel 53. The teeth 531 and 541 are parallel to the axis XX' which in its turn is parallel to the axis YY' of rotation of the gear wheel 53. This entire kinematic assembly is housed in a water-tight casing 57 which is connected in liquid-tight manner to the cylinder 10 by the gasket 59, the gasket 58 assuring tightness between the hollow rod 42 and casing 57.

The volume of the compact feed mass 30 is determined so as to obtain a given operating time of the reactor.

When the cylinder 10 no longer contains any particles, the downward stroke of the head 40 is stopped by an end-of-stroke contact (not shown). The clutch device 55 is then placed in disengaged position which causes the stopping of the gear wheel 53 and therefore a rapid ascent, in the direction indicated by the arrow F'4-2, of the head 40 due to the rotation of the screw 56. The empty cylinder 10 can then be replaced by another cylinder 10 containing another compact feed mass 30 so as to carry out another operation.

The compacting liquid and the carrier liquid may be identical or different in composition; they may possibly consist of the reactor liquid itself. This latter solution is preferable for purposes of simplicity, provided that the reactor liquid does not rapidly react chemically with the particles, in which case it is necessary to use a different compacting liquid and possibly a different carrier liquid, the different liquids being preferably miscible and not chemically reactive with each other, so as to favor a good entrainment of the particles into the reactor.

In the devices 4 and 5 which have been described above, the erosion of the compact feed mass 30 and the introduction of the carrier liquid take place towards the bottom. It is obvious that other directions can be contemplated for this erosion and/or this introduction of regenerating the zincated electrolyte in an installation, not shown in FIG. 6.

The feed process in accordance with the invention thus makes it possible to maintain a percentage by weight of zinc particles in the electrolyte within precise limits with a small expenditure of energy for the erosion of the feed mass 30, this expenditure of energy being less, in the example described, than 1% of the energy delivered by the generator 6. The predetermined limits may be very narrow, for instance ±1% of the average concentration selected. The potassium hydroxide solution reacts slightly with the zinc to liberate hydrogen, but the small amount of potassium hydroxide solution in the compact feed mass permits the latter to become rapidly saturated with potassium zincate so that the reaction does not progress and this feed mass can be stored for very long periods of time without any danger of prolonged attack of the zinc by the potassium hydroxide solution. This is not true of concentrated slurries of particles of zinc and potassium hydroxide aqueous solutions. As a matter of fact, in these slurries, the ratio of $$\frac{\text{mass of potassium hydroxide solution}}{\text{mass of zinc}}$$

is in general greater than 1. Thus, for instance, if one allows particles of zinc to settle out in 6 N potassium hydroxide solution, these particles being identical with the particles 612 used in the generator 6, and if one removes the potassium hydroxide solution located above this sedimentation bed, the ratio of $$\frac{\text{mass of potassium hydroxide solution}}{\text{mass of zinc}}$$

in the slurry thus obtained is equal to 1.3. These large amounts of potassium hydroxide solution in the slurries lead upon storage to a substantial attack of the zinc, with all the above described drawbacks which result therefrom.

On the other hand, the potassium hydroxide solution which occupies substantially all the empty spaces left by the particles in the compact feed mass protects these particles against attack by the air so that only a superficial attack of said mass by the air need by feared and this can be avoided, for instance, in a very simple manner by means of a protective plastic film.

The operation of the erosion device 4 used to feed the generator 6 can be effected in two ways, namely either continuously or intermittently.

In continuous operation, the erosion head 40 rotates continuously when the generator 6 delivers current and the quantity of secondary particles 612 introduced into the generator 6 is a function of the intensity of the current delivered by the generator. The erosion device 4 is therefore controlled by the intensity of the current discharged by the generator. FIG. 7 shows such an electric control circuit 7. The shunt 71 gives a signal which is the image of the current intensity I delivered by the generator 6 into the discharge circuit 70 which comprises the discharge impedance 701, for instance an electric motor. This signal is amplified by the amplifier 72 and makes it possible to modify the fixed voltage U 73 available at the terminals of an external source of direct current 73. The variable voltage U 74 thus obtained at the positive and negative terminals of the regulator 74 makes it possible, for instance, to feed the motor 50 shown in FIG. 5. The voltage U 74 varies as a function of the current intensity I delivered by the generator 6 and therefore the speeds VT and VR vary as a function of this intensity, for instance proportionally to said intensity, VT being the speed of translation of the erosion head 40, expressed for instance in mm/minute and represented by the arrow F4-2 (FIG. 4), and VR being the speed of rotation of said head 40, expressed for instance in revolutions/minute and represented by the arrow F4-1 (FIG. 4). In the device 5 shown in FIG. 5 the ratio between the speeds VT and VR is constant for a given pitch of the screw 56 when the ratios between the number of teeth of the gear wheel pairs 51, 52, on the one hand, and 53, 54, on the other hand, have been determined, the values of the speeds of rotation and of translation given previously by way of example for the head 40 of the device 623 corresponding to this type of operation.

This arrangement may have the drawback of permitting only a relatively low speed of rotation VR when the current intensity I delivered by the generator 6 is low, so that the erosion head 40 may then possibly be blocked in contact with the compact feed mass 30, or rotate in contact with said mass without disaggregation of said mass. This is true in particular in the device 623 when the speed of rotation becomes less than 12 rpm. Under these conditions, it may be advantageous to provide two separate motors, as in the device 8 shown in FIG. 8. This device 8 comprises a rotation motor 80 and a translation motor 81. The rotation motor 80 drives the head 40 in rotation via a gearing consisting of the pair of gear wheels 53, 54 analogous to the pair 53, 54 shown in FIG. 5.

The speed of rotation VR is constant, its value having been selected rather high in order to avoid blocking of the head 40 in contact with the compact feed mass 30 (not shown in the drawing for purposes of simplification) and in order to avoid rotation of the head 40 without disaggregation of the mass 30. The translation motor 81 turns the screw 56 which turns in the nut 421 which is rigidly connected with the gear wheels 54 and the head 40, the difference in angular rotation between the screw 56 and the nut 421 resulting in the translation of the head 40 as in the feed device 5. The motor 81 may, for instance, be an electric motor connected to the terminals of the regulators 74 and thus be subjected to the voltage U 74 which is variable as a function of the current intensity I delivered by the generator 6, the speed of translation VT being then, for instance, proportional to said current intensity so that the quantity of secondary particles 612 introduced into the generator 6 is itself proportional to said current intensity. A device (not shown) makes it possible to return the erosion head 40 upwards when there is no further compact feed mass 30.

In intermittent operation, the erosion head 40 does not turn during the entire time that the generator 6 delivers current. One can, for instance, contemplate varying the quantity of secondary particles 612 introduced into the generator 6 as a function of the quantity of electricity supplied by the generator 6. FIG. 9 shows such an electric control circuit 9. The signal given by the shunt 71 is forwarded via the device 90 which measures the amount of electricity delivered by the generator 6, this amount of electricity being, for instance, calculated in ampere-hours. This number of ampere-hours is compared in the device 91 with a given ampere-hour increment represented diagrammatically by the liquid, for example, a direction opposite to the one which has been described, the erosion of the compact feed mass 30 and/or the introduction of the carrier liquid then taking place towards the top. It is obvious furthermore that several different compact feed masses can be used, arranged in the same feed cylinder, which may facilitate the charging of the feed devices. FIG. 10 shows one such device 4'. This device 4' comprises a feed cylinder 10' in which four identical feed masses 30' are superposed. Each of these masses 30' comprises a lower face 301' and an upper face 302', the said lower and upper faces having a substantially identical conical shape, and the opening of these cones of angle α being directed downward so as to permit the stacking of the masses 30' one on the other. The charging of the masses 30' is effected through the upper part 100' of the cylinder 10' parallel to the downwardly directed arrow F10. The erosion head 40' is arranged initially at the lower portion 102' of the cylinder 10' so that its knives 41' are substantially tangent to the conical lower face 301' of the mass 30' located at the lowest level. The head 40', driven by the rod 42', rotates around the axis (not shown) of the rod 42' and progresses upwardly, along said axis, parallel to the arrow F'10 during the erosion of the mass 30' with which it is in contact. The hollow rod 42' which passes through the head 40' permits the introduction therethrough of the carrier liquid (not shown) in upward direction, parallel to the arrow F'10. The carrier liquid thus arrives into contact with the lower face 301' of the eroded mass 30' and entrains the secondary particles 32' downward between the head 40' and the cylinder 10' in the direction indicated by the arrow F10-1, this flow being made possible, for instance, by causing the knives 41' to protrude from the side face 43' of the head 40'.

It is thus possible to charge the cylinder 10' with masses 30' while carrying out the erosion operation or before the complete erosion of the masses 30' contained in the cylinder 10'. The masses 30' can, for instance, be obtained by compacting with a piston in a cylinder whose bottom, which is without opening, has a conical shape, the other compacting characteristics being similar to those which have been previously described.

FIG. 6 shows the use of a feed device in accordance with the invention in an electrochemical generator.

The generator 6 comprises a cathode compartment 60 and an anode compartment 61. The cathode compartment 60 has a cathode 601 which is, for instance, an air or oxygen diffusion electrode, the entrance and departure of gas being represented schematically by the arrows F60 and F'60. The electron collector (not shown) of the cathode 601 is connected with the positive terminal P of the generator 6. The anode compartment 61 has an electron collector 611 arranged opposite the cathode 601. An electrolyte (not shown) containing anode-active particles 612 moves through the anode compartment 61 between the electron collector 611 and the cathode 601. The electron collector 611 is connected to the negative terminal N of the generator 6. During the discharge of the generator 6, the anode active particles 612 are oxidized in the anode compartment 61, losing electrons, while the oxygen, the cathode active material, is reduced in the cathode 601 taking up an equivalent number of electrons. The outlet 614 of the anode compartment 61 is connected to the inlet 613 of said anode compartment 61 by a path 62, on the outside of the anode compartment 61, this path comprising, in series, a pump 622 and a buffer tank 621 for electrolyte and particles. A feed device 623 which makes it possible to introduce the particles 612 into the electrolyte debouches into this path 62, this device 623 in accordance with the invention being, for instance, the feed device 5 shown in FIG. 5. The anode active particles 612 are formed for instance in whole or in part of an anode active metal, these particles being in particular zinc particles, the electrolyte being, for instance, an alkaline electrolyte. The operating conditions may—without this being in any way limitative—be the following:

electrolyte (reactor liquid): 4 to 12 N potassium hydroxide aqueous solution (4 to 12 mols of potassium hydroxide per liter), compacting liquid and carrier liquid: initial composition identical to that which the electrolyte has at the start of the discharge, namely: 4 to 12 N potassium hydroxide aqueous solution, substantially nonzincated, percentage by weight of zinc in the electrolyte introduced into the anode compartment 61: 20% to 30% of the weight of the electrolyte, average dimension of the zinc particles introduced into the compacting liquid 2 before the production of the compact feed mass 30: 10 to 20 microns, ratio $$\frac{\text{mass of compacting liquid}}{\text{mass of zinc}}$$

in the compact feed mass 30: from 0.15 to 0.35, the ratio being for instance substantially equal to 0.22 when the compacting liquid 2 is 6 N potassium hydroxide solution, speed of rotation of the head 40: from 12 to 120 rpm, speed of translation of the head 40: from 0.12 to 1.2 mm/minute, this translation taking place along the arrow F4-2;

rate of flow of the carrier liquid: from 10 to 20 cc/minute/cm$^2$ of inner cross section of the cylinder 10.

During the discharge, the generator 6 gives off, into the discharge circuit (not shown) arranged between the terminals P and N, a current which varies from 5 amperes to 50 amperes under a voltage close to 1 volt, which corresponds to a consumption of zinc varying substantially from 0.108 to 1.08 g/minute. The maximum and minimum values given previously for the speeds of rotation and translation correspond to the maximum and minimum consumptions of zinc respectively.

The initial particles of zinc have a tendency to agglomerate in the potassium hydroxide solution to form larger particles so that the primary particles 31 which are present in the feed mass 30 or the secondary particles 32 which are present in the electrolyte are, on the average, from 50 microns to 500 microns, these secondary particles 32 constituting the anode-active particles 612.

During the discharge, the concentration of oxidized zinc dissolved in the form of potassium zincate in the electrolyte is maintained at less than a predetermined value, equal for instance to about 120 g/liter, when the electrolyte is 6 N potassium hydroxide solution, so that the particles of zinc are not made inactive by an accumulation of the reaction product on their surface or in the vicinity of their surface.

This result can be obtained either by replacing the zincated electrolyte by a fresh solution of potassium hydroxide free of zincate when its concentration of dissolved zinc becomes excessive, or by continuously rectangle 911 and the arrow F9. When the number of ampere-hours delivered by the generator 6 corresponds to the increment, the device 91 actuates the switch 92 so that the voltage U 93 at the terminals of the contactor 93 is equal or proportional to the constant voltage U 73 of the direct current generator 73 depending on the nature of the circuit 94 connecting the generator 73 to the contactor 93. This constant voltage U 93 is available due to the switch 92 for a constant given time Ta, called the feed time. During this Time Ta, the voltage U 93 feeds, for instance, the motor 50 of the feed device 5 and the head 40 is then imparted a given constant speed of rotation VR and a given constant speed of translation VT which are equal, for instance, to the maximum values indicated above, that is to say 120 rpm and 1.2 mm/minute, respectively, resulting in the feeding of a constant quantity of secondary particles 612 for a given amount of electricity supplied by the generator 6, the period between two successive feeds being variable as a function of the intensity of the current delivered by the generator. The same principle can be used with the device 8.

It is clear that everything described above applies when the zinc particles are introduced into the generator 6 with a feed device other than the feed devices 5 and 8, for instance, with the device 4' which has been described above and is shown in FIG. 10.

This device 4' may then be driven in a manner identical to the driving of the erosion device 4 in feed devices 5 and 8, but in opposite direction, the erosion head 40' being then directed upward instead of being directed downward as in the feed devices 5 and 8. Of course, the invention is not limited to the embodiments described above, on basis of which one can contemplate other embodiments and forms without thereby going beyond the scope of the invention. The invention applies in particular to the case where the reactor is both a chemical reactor and an electrochemical reactor, the secondary particles serving, for instance, chemically to regenerate an active material which reacts electrochemically in the reactor.

What is claimed is:

1. Process consisting of introducing particles into at least one liquid, called the reactor liquid, used in at least one chemical and/or electrochemical reactor, characterized by the fact that at least one substantially compact feed mass comprising particles, called primary particles, and a small amount of at least one liquid, called compacting liquid, which is chemically unreactive or only slightly reactive with said primary particles, is eroded so as to dissociate said compact feed mass into particles, called secondary particles, which are entrained into the reactor liquid by at least one carrier liquid.

2. Process according to claim 1, characterized by the fact that the compacting liquid, the carrier liquid and the reactor liquid have the same initial composition.

3. Process according to claim 1, characterized by the fact that the primary particles and the secondary particles are substantially the same in size.

4. Device permitting the introduction of particles into at least one liquid, called the reactor liquid, used in at least one chemical and/or electrochemical reactor, characterized by the fact that it comprises erosion means for eroding at least one substantially compact feed mass comprising particles, called primary particles, and a small amount of at least one liquid, called compacting liquid, which is chemically unreactive or only slightly reactive with said primary particles, so as to dissociate said compact feed mass into particles, called secondary particles, and circulating means for circulating at least one carrier liquid in contact with said compact feed mass in order to entrain said secondary particles into the reactor liquid.

5. Device according to claim 4, characterized by the fact that the erosion means comprises a head to which can be imparted a movement of rotation and of translation.

6. Device according to claim 5, characterized by the fact that the head has at least one knife.

7. Device according to claim 5, characterized by the fact that the head is movable within a cylinder of revolution, called the feed cylinder, in which the compact feed mass can be contained, the head being rotatable around an axis which is also the axis of translation of the head, said axis being substantially identical with the axis of the feed cylinder.

8. Device according to claim 7, characterized by the fact that the compact feed mass is obtainable by compacting the compacting liquid and the primary particles in the feed cylinder or in a cylinder of revolution, called the compacting cylinder, by means of a piston, the major part of the compacting liquid being eliminated from the compact feed mass during this compacting.

9. Device according to claim 5, characterized by the fact that at least the face of the compact feed mass which is intended to be in contact with the head has the shape in intaglio of a conical frustum or of a cone.

10. Device according to claim 5, characterized by the fact that the head is rigidly connected to one end of a hollow rod whose axis coincides with the axis of rotation and of translation of the head, said rod comprising within it a nut whose axis is identical to the axis of the rod, a screw rotatable in said nut, the other end of the rod being rigidly connected to a gear wheel whose axis of rotation is identical to that of the rod.

11. Device according to claim 10, characterized by the fact that the screw and the gear wheel which is rigidly connected to the rod are driven in rotation, the movement of translation of the head during the erosion of the compact feed mass being obtained by means of a difference in angular speeds of rotation of the screw and of the gear wheel which is rigidly connected to the rod.

12. Device according to claim 11, characterized by the fact that the screw and the gear wheel which is rigidly connected to the rod are driven by the same motor.

13. Device according to claim 11, characterized by the fact that the screw and the gear wheel which is rigidly connected to the rod are driven by two different motors.

14. Device according to claim 4, characterized by the fact that the reactor is an electrochemical generator of electric current and by the fact that the quantity of secondary particles introduced into the electrochemical generator is controlled by the intensity of the electric current delivered by the electrochemical generator.

15. Device according to claim 12, characterized by the fact that the reactor is an electrochemical generator of electric current and by the fact that the motor is an electric motor fed by a voltage which is variable as a function of the electric current delivered by the electrochemical generator, the speeds of rotation and translation of the head during the erosion of the compact feed mass being substantially proportional to the intensity of the electric current delivered by the electrochemical generator, the ratio between said speeds being constant.

16. Device according to claim 13, characterized by the fact that the reactor is an electrochemical generator of electric current and by the fact that the motor which drives the gear wheel which is rigidly connected to the rod causes the head to rotate at a constant speed and by the fact that the screw is driven by an electric motor fed by a voltage which is variable as a function of the electric current delivered by the electrochemical generator, the speed of translation of the head during the erosion of the compact feed mass being substantially proportional to the intensity of the electric current delivered by the electrochemical generator.

17. Device according to claim 4, characterized by the fact that the reactor is an electrochemical generator of electric current and by the fact that the quantity of secondary particles introduced into the electrochemical generator is controlled by the amount of electricity delivered by the electrochemical generator.

18. Device according to claim 17, characterized by the fact that, during its operation, the head has constant speeds of rotation and of translation, the simultaneous rotation and translation of the head taking place intermittently for constant feed times.

19. Device according to claim 4, characterized by the fact that the compacting liquid, the carrier liquid and the reactor liquid have the same initial composition.

20. Device according to claim 4, characterized by the fact that the primary particles and the secondary particles are substantially the same in size.

21. Device according to claim 5, characterized by the fact that the translation of the head during the erosion of the compact feed mass takes place from the bottom to the top of the compact feed mass.

22. Device according to claim 5, characterized by the fact that the translation of the head during the erosion of the compact feed mass takes place from the top to the bottom of the compact feed mass.

23. Device according to claim 7, characterized by the fact that the translation of the head during the erosion of the compact feed mass takes place from the top to the bottom of the compact feed mass and by the fact that the compact feed mass is at the lower portion of said feed cylinder, said lower portion and the compact feed mass each having an opening, these openings communicating with each other and having substantially the axis of the feed cylinder as their axes.

24. Device according to claim 8, characterized by the fact that the piston slides along a removable rod whose axis coincides with the axis of the cylinder in which the compacting is effected.

25. Device according to claim 23, characterized by the fact that it comprises an inlet for the carrier liquid above the head, the carrier liquid and the secondary particles emerging from the device through the openings in the lower portion of the feed cylinder and of the compact feed mass.

26. Device according to claim 5, characterized by the fact that the introduction of the carrier liquid takes place from the inside of a hollow rod through the head.

27. Device according to claim 4, characterized by the fact that its erosion means make it possible to erode in succession several superimposed compact feed masses.

28. Device according to claim 27, characterized by the fact that it comprises means which permits the introduction into the device of at least one compact feed mass during the operation of the erosion means or before the complete erosion of the compact feed masses.

29. Chemical reactor utilizing the device according to claim 4.

30. Electrochemical reactor utilizing the device according to claim 4.

* * * * *